United States Patent [19]

Spackman et al.

[11] Patent Number: 5,023,809

[45] Date of Patent: Jun. 11, 1991

[54] TARGET TRACKING DEVICE

[75] Inventors: Kerry P. Spackman; Henry A. Whale, both of Auckland, New Zealand

[73] Assignee: Precision Technology Inc., Newark, N.J.

[21] Appl. No.: 541,089

[22] Filed: Jun. 19, 1990

Related U.S. Application Data

[63] Continuation of Ser. No. 265,692, Nov. 1, 1988, abandoned.

[30] Foreign Application Priority Data

Feb. 2, 1987 [NZ] New Zealand ........................ 222404

[51] Int. Cl.⁵ .......................... G06F 15/50; H04N 7/18
[52] U.S. Cl. .................................... 364/516; 364/517; 364/448; 235/411; 358/105
[58] Field of Search ............... 364/516, 517, 447, 448, 364/449; 235/411; 358/105, 125, 126

[56] References Cited

U.S. PATENT DOCUMENTS 4,270,143  5/1981  Morris ................................. 364/516
4,320,287  3/1982  Rawicz ................................ 364/516
4,550,435  10/1985  Hayman ............................ 358/126
4,626,908  12/1986  Tani .................................... 358/125
4,739,401  4/1988  Sacks et al. ....................... 358/105
4,823,137  4/1989  Mallick .............................. 364/449

Primary Examiner—Parshotam S. Lall
Assistant Examiner—Brian M. Mattson
Attorney, Agent, or Firm—Fleit, Jacobson, Cohn, Price, Holman & Stern

[57] ABSTRACT

A target tracking system tracks the position of a vehicle, such as a racing vehicle. An oscillator is positioned at the target to be tracked, and a transmitter is also positioned at the target for transmitting a signal generated by the oscillator. At least three translators receive the signal transmitted from the target and each retransmits the signal to a base receiving station. The base receiving station also receives the signal sent from the target and includes a comparator for comparing each of the signals received from the translator with the signal sent directly from the target. The output of the comparator provides an indication of the position of the target relative to the base receiving station.

7 Claims, 3 Drawing Sheets

REMOTE TRANSLATORS

RECEIVERS AT A

|   | B | C | D |
|---|---|---|---|
| K | 19 | 43 | 67 |
| M | 4 | 5 | 4 |
| L | 21 | 38 | 37 |
| $F_1$ | 1.908 | .843 | .541 MHz |
| $F_2$ | 40.066 | 32.035 | 40.037 MHz$_1$ |
| $F_3$ | 160.263 | 160.174 | 160.149 MHz$_2$ |

TARGET TRACKING DEVICE

This is a continuation of application Ser. No. 07/265,692, filed Nov. 1, 1988 now abandoned.

BACKGROUND OF THE INVENTION

This invention relates to a target tracking system for a vehicle and has been devised particularly though not necessarily solely for tracking the position of a vehicle such as a racing vehicle.

It is an object of the present invention to provide a target tracking system which will at least provide the public with a useful choice.

SUMMARY OF THE INVENTION

Accordingly the invention consists of a target tracking system comprising an oscillator, a transmitter to transmit a signal representative of the signal generated by said oscillator at substantially a selected frequency, at least three translators to receive the transmitted signal and retransmit that signal to a base receiving station which also receives a direct signal from the transmitter, and means to compare the received signals to thereby track the target.

To those skilled in the art to which the invention relates, many changes in construction and widely differing embodiments and applications of the invention will suggest themselves without departing from the scope of the invention as defined in the appended claims. The disclosures and the descriptions herein are purely illustrative and are not intended to be in any sense limiting.

BRIEF DESCRIPTION OF THE DRAWINGS

One preferred form of the invention will now be described with reference to the accompanying figures in which.

DESCRIPTION OF THE PREFERRED EMBODIMENT

One preferred form of the invention will now be described with reference to the figures.

Figure 1:
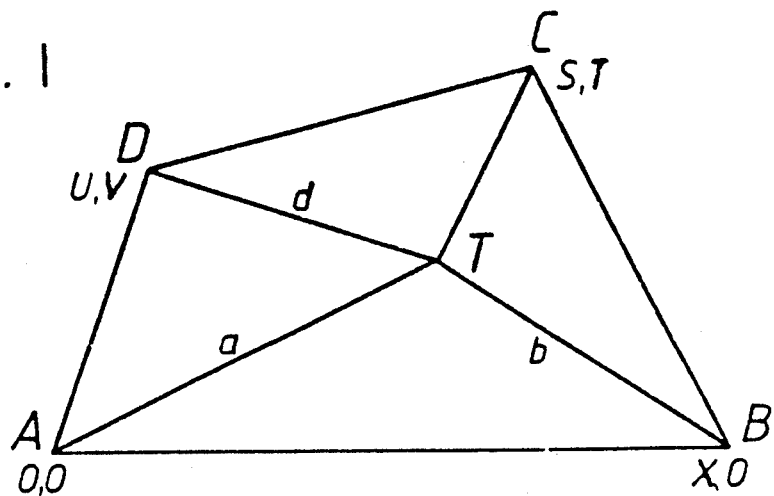
FIG. 1 is a general diagram of a system utilized in the vehicle tracking system of the invention.

The overall purpose of the tracking system is to obtain the position, velocity and acceleration of a target (such as a vehicle) moving within a defined area. Such a target may be a racing motor vehicle, for example. A system that will provide these measurements is shown in outline on FIG. 1. This is a VHF phase comparison system that takes advantage of the fact that, with four observing stations, the phase ambiguities normally associated with such systems can be resolved without recourse to any new setting up procedure. There are two separate problems involved here. The first is the initial setting up or "calibrating" procedure and the second is that of recovering from a situation, during operation, where one or more of the signals from the target to the receiving stations are temporarily lost. The initial setting up is most easily accomplished by using a known location for the target, while the complexity of resolving the second problem depends on how many of the signals are temporarily lost. The system can cope with the temporary loss of all signals although there will, of course, be a gap in the data should this occur.

The target is provided with a stable oscillator that generates a signal at a selected frequency, preferably a continuous signal at say 36.25 MHz, a recognized telemetry band. The wavelength is thus about 8.3 m so that any measurement of the received phase of this signal with respect to some other coherent signal at the same frequency such as an identical oscillator at a base receiving station, is ambiguous by some unknown multiple of 8.3 m. Such phase comparisons are carried out at the base station A where the signal from the target is received by the four different routes TA, TBA, TCA and TDA. Changes in these distances as the target is moved are then observable since the way in which the phase of the received wave changes with respect to the reference oscillator at A can be continually monitored. Each path will thus have an unknown constant distance associated with it but the changes from this constant distance can be monitored. Since all phase comparison systems that include any translation of frequencies include at some point in the link either a frequency divider or a frequency multiplier, there is always an unknown delay that arises from the indeterminacy of which cycle was used for the start of the multiplying or dividing process. This indeterminacy is removed in the calibrating process but, if the system temporarily loses lock because of a loss of signal, for example, it will probably lock on again (when the signal is recovered) at a different relative cycle. It is for this reason that it is necessary to have a system that can recover from a loss of lock on some or all channels.

The simplest and most direct way to measure the four unknown distance constants is to place the target at some known reference point; this will give outputs that are phase differences that will be used as zero references representing the known distances ao, bo co and do, say. The extra distances X, P and Q (in FIG. 2) and any phase changes occurring in the translating of frequency at B, C and D and in the receiving equipment at A are all constant and are taken into account in this setting up procedure. Henceforward, as T moves, the distances a, b, c and d are continuously available as outputs.

There are two problems that can arise with the system as described above. The first is that the signal from the target must be received continuously over all channels, i.e. a drop-out for some reason over a particular channel means that the ambiguity of some integral number of wavelengths is reintroduced. However, since only two stations are needed to specify the position of the target (if its approximate location is known), the resolution of the ambiguity can be accomplished quite rapidly once the signal re-appears. Even if all signals are lost, the ambiguities can be resolved once all signals reappear by using the fact that there is a relation between the four measured distances a, b, c and d that relies only on the location of the stations A, B, C and D and allows some constants equivalent to those obtained in the initial setting-up procedure that used a reference position to be found. This geometrical relationship and its use is discussed hereinafter under the heading of Geometric Considerations.

The second problem is that, although it has been postulated that synchronous oscillators are used in the target and at the base receiving station to enable the phase comparisions to be carried out, there is always the possibility that some drift of the oscillators relative to each other will occur. The standard oscillators proposed for this purpose can be relied on to about 1 part in $10^9$ in this application where the target is subjected to considerable accelerations. This is equivalent to a range error that could be increasing or decreasing by about 2 m every 6 seconds. But all ranges i.e. a, b, c and d, will increase or decrease together. The geometrical relationship mentioned above also allows this drift, if any, to be monitored continuously so that the appropriate corrections can be made. It is thus possible that much less sophisticated oscillators could be used. The geometrical expression used for drift correction is also discussed under the heading of Geometric Considerations.

A back-up level of redundancy is possible since, if the oscillators should drift too far out of synchronization (although this is unlikely under normal circumstances) the system can revert to a hyperbolic navigation system. The computations required for this are much more complex than for the standard system and might have to be carried out ex-post facto—nevertheless there is this characteristic available in the system.

The system as described above provides position measurements and, since all distances are measured continuously, outputs are provided essentially continuously. The rate at which outputs giving new information on the position are available depends on the bandwidth of the system. This is a quantity that should be small enough to ensure immunity against interference from ignition noise, for example, while still being large enough to accommodate any oscillator drift and the doppler shift arising from the motion of the target. With the stable oscillators that are proposed, the frequency drift will be much less than 1 Hz so that this presents no problem. The doppler shift that is observed when the target is moving directly towards or away from one of the observing stations at 100 m/sec (360 km/hr or 220 mph) is about ±12 Hz. Thus, an overall bandwidth of ±100 Hz would enable measurements to be made at the rate of 50 per second if required and would give excellent noise immunity with quite small power radiated from the target. This is discussed in more detail under the heading Antennae and Power. Velocity measurements can be obtained from the difference between successive position measurements and can also be obtained from a direct measure of the doppler shift of the received signals. Since this gives an independent check of the position measurements it is proposed that both measurements be made.

The measurements of acceleration can be made from the difference between successive velocity measurements. From the equipment there will also be control signals available that are proportional to the acceleration components in the directions of a,b,c and d and this will provide a check on the velocity measurements if desired.

CHOICE OF FREQUENCIES

There are various bands available for telemetry applications which is the type of operation under which this work would be classified. The main considerations are that a small antenna must be used on the target vehicle, that the antennae required for transferring information on the phases of the signals received at B, C and D back to the base station at A be not too large, and that there be some reasonably simple relation of the form N/M (where N and M are integral numbers) between the frequency transmitted by the target vehicle and each of the three different frequencies used over the paths BA, CA and DA. In order to minimize shadowing effects, the frequency of the target transmitter should be as low as is consistent with the requirement for a small radiating antenna. There is the additional factor that it is desirable that the target transmitter frequency be reasonably easily obtainable from the standard 10 MHz reference oscillator so that the phase jitter that is inevitably introduced in any division or multiplication of frequency is minimized. There are obviously many possible solutions but, eventually it has been concluded that a very useful solution is to choose 36.250 MHz for the target transmitter and three frequencies in Band C (160.1375 to 160.3125 MHz) for the communications frequencies. The simplest ratios between the frequencies in Band C to 36.250 are: 367/83, 84/19, 137/31, 190/43, 296/67, 349/79.

Of these, the second, fourth and fifth have numerators that are not primes so that at least the divisions or multiplications that are required at the higher frequency are simplified. These then give frequencies of 160.263, 160.174 and 160.149 for the communication links. Although these are not standard for Band C, the facts that only low power is required and that the antennae are directional so that the signals are not widely disseminated should make them acceptable to any licensing authority.

The target transmitter frequency of 36.250 MHz has a quarter-wave-length of 2.07 m. This can be used as the length of the receiving antennae at A, B, C and D but is rather large for the target vehicle. However, the required physical length can be reduced drastically by using a double-spiral-wound or zig-zag antenna.

BUILDING BLOCKS OF SYSTEM

Figure 3:
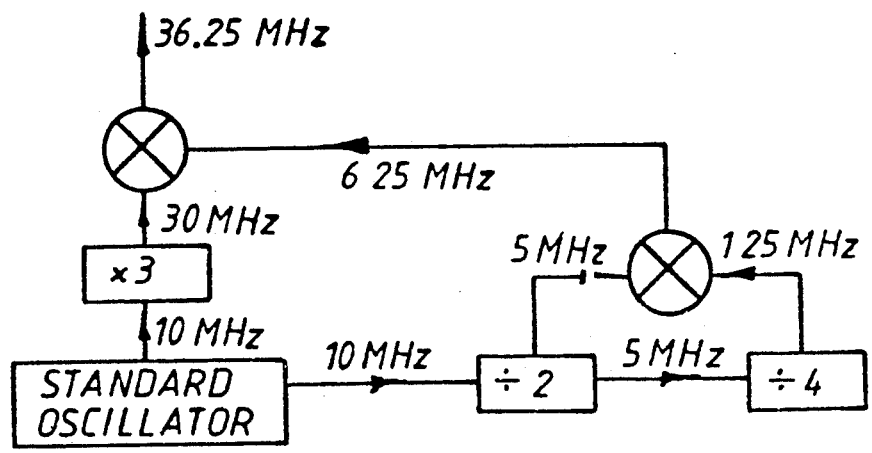
FIG. 3 is a block diagram showing a method of obtaining a transmitting frequency from the oscillator frequency in the system of the invention.

The target vehicle contains a stable oscillator such as a 10 MHz oscillator from which the equally stable transmitted frequency is derived. A straightforward way of accomplishing this is suggested in FIG. 3. An identical unit is required for the reference standard at station A.

Figure 4:
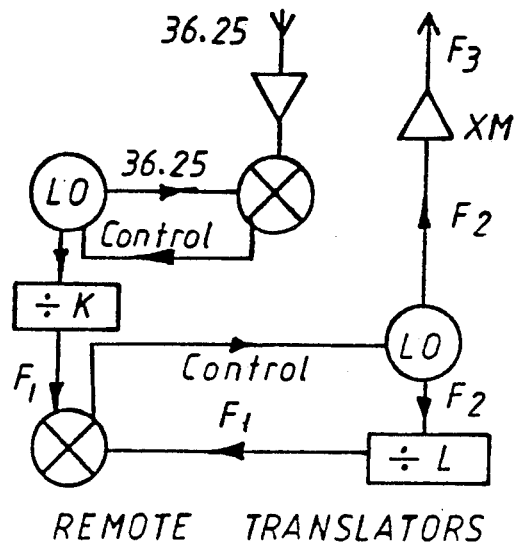
FIG. 4 is a block diagram showing a method of achieving frequency conversion at the translators of the invention.
Figure 4:
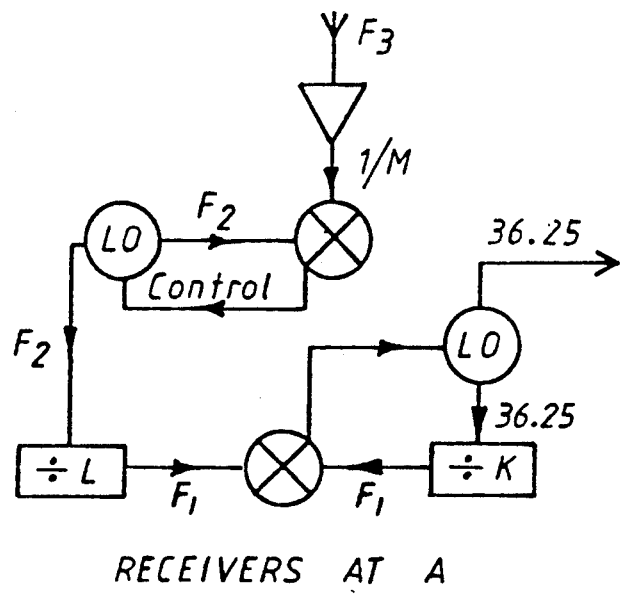

The translators must convert this frequency of 36.25 MHz to one of the three chosen communication frequencies of 160.263, 160.174 and 160.149 MHz. Suggested methods of accomplishing this are shown at the top of FIG. 4.

Two phase-locked-loops are included in each unit in order to provide the narrow bandwidths needed to ensure noise immunity and also to provide clean signals for dividing by the rather unusual integers required. The frequencies of the local oscillators have been chosen so that they are all in the same general range and thus are more or less compatible, i.e. development time should be minimized. The lowest frequency used in the circuit is 0.541 MHz (for receiver D) so that the phase jitters arising from excessive multiplication ratios should be satisfactorily small.

Identical components are used in the receivers at the base station A, again to reduce development time.

Four signals are finally obtained at 36.25 MHz from the 4 stations A, B, C and D that must be compared in phase with that from the standard oscillator at A. There are two parts to this since whole wavelengths must be counted as they increase and decrease and also the residual phase difference must be measured. Each signal exhibits a phase difference must be measured. Each signal exhibits a phase change that is proportional to the change in the distances a, b, c and d (in FIG. 1) but also contains an unknown constant component. This constant component *must* be discovered in the setting-up or computation procedures.

To ease the measurement problem, some phase multiplication can be introduced since all the signals are now available, for the first time in the system, at the same frequency. This is accomplished by mixing all channels down to 10 kHz using the same mixing signal of 36.240 MHz and then multiplying by 10. The phase comparisons are then carried out at 100 kHz. This is achieved by the circuits in FIG. 5. The top circuit is a modification of FIG. 3 since we now require a different frequency. Both of these reference circuits can be simplified by using phase locked-loops (e.g. 36.25/10=29/8 and 36.24/10=151/25), but the systems drawn are preferred because of their inherent phase stability since they are essentially passive in their operation.

Figure 5:
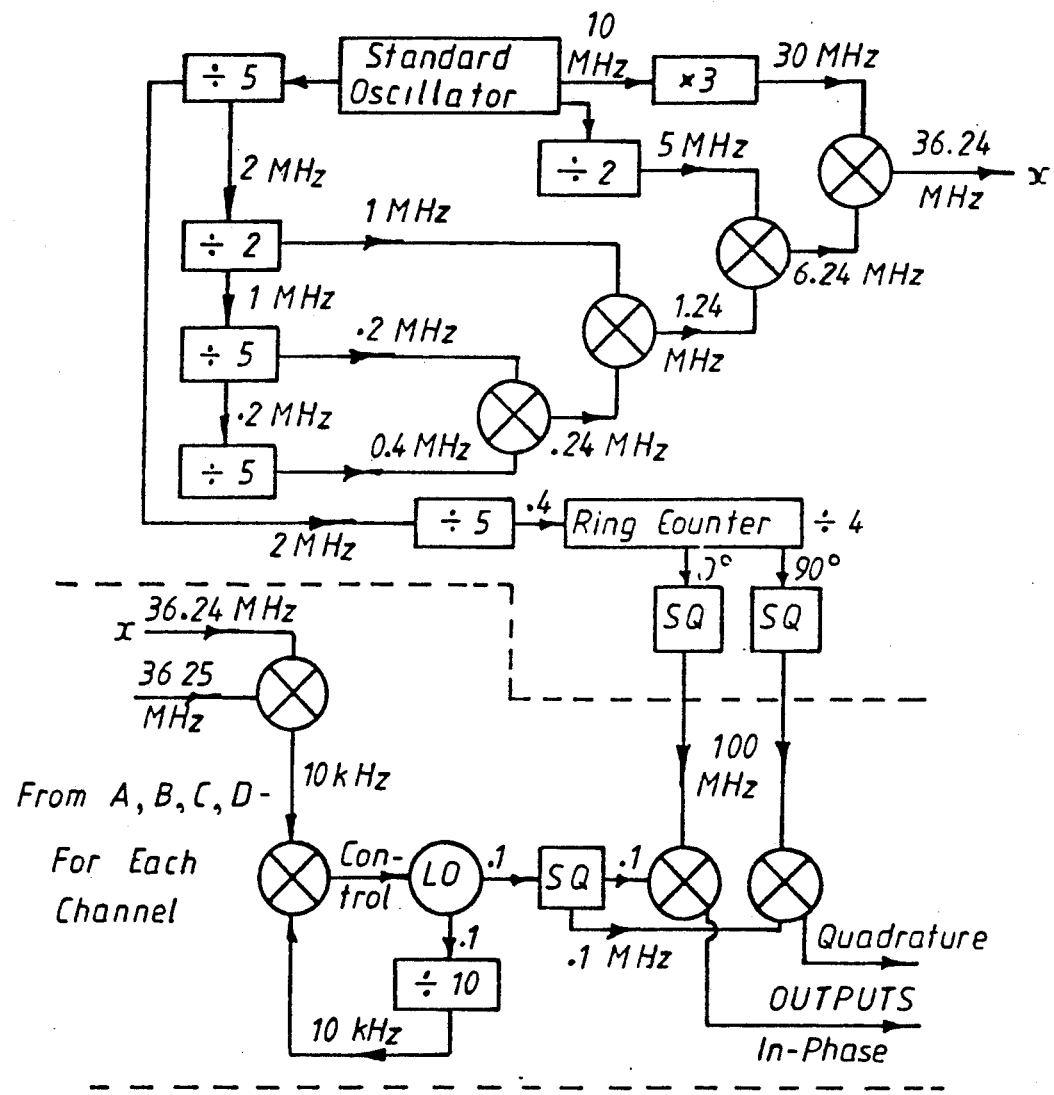
FIG. 5 is a representation of circuitry for carrying out phase comparison in the vehicle tracking system of the invention.
Figure 5:
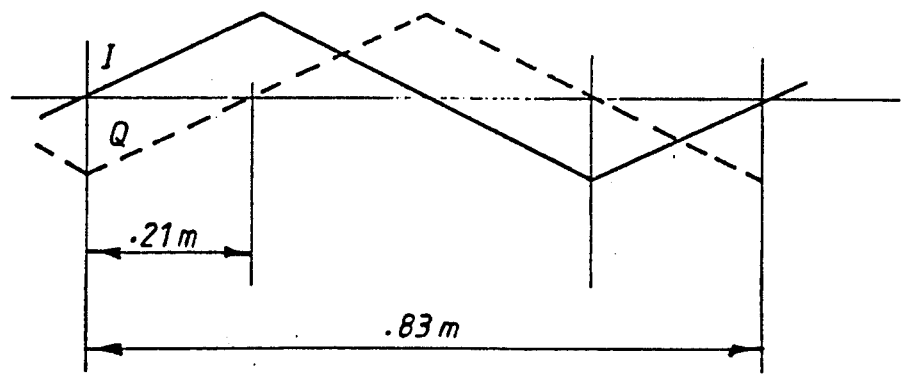

The two outputs are related as shown in the bottom of FIG. 5. Simple logic circuits determine whether the distance being measured is increasing or decreasing and then counts of zero crossings give the distance to within $\pm 0.21$ m. It is straightforward to include A/D converters to interpolate within this accuracy.

GEOMETRIC CONSIDERATIONS

Figure 2:
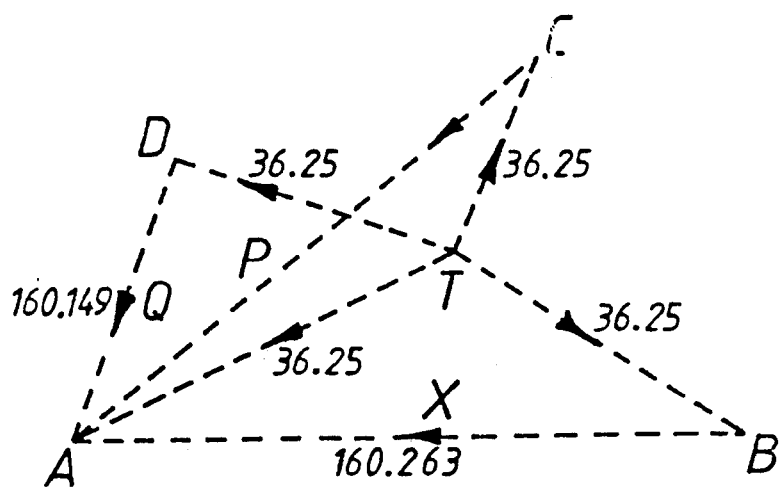
FIG. 2 is a diagrammatic representation of the vehicle tracking system of the invention.

In FIG. 2, let the coordinates of the receiving antennas at A, B, C and D be given by:

$$A=(0,0), B=(X,0), C=(S,T), D=(U,V)>$$

Then, wherever T is, $$(L-M+N) a^2 - Lb^2 + Mc^2 Nd^2 = J, \text{ where} \quad (1)$$

$$L=VS-UT, M=VX, N=TX$$

$$J=X(UT(X-U)+SV(S-X)+TV(T-V)$$

If the system has been calibrated by placing the target at a known position or by some other method such as that outlined below, then any drive between the oscillators will change all the distances by an equal amount. Assume that the measured distances referred to the positions A, B, C and D are written as A, B, C, and D and that these are all too large by the drift e, interpreted as a distance.

Then $$a=A-e, b=B-e, c=C-e, d=D-e$$

From equation (1) above $$e = \frac{(L-M+N)A^2 - LB^2 + MC^2 - ND^2 - J}{2((L-M+N)A - LB + MC - ND)}$$

where all the factors are known since L, M, N and J depend only on the positions of the receiving stations and A, B, C and D are the observed distances for any one location of the target T. This means that the relative stability of the two oscillators can be continuously monitored.

While the most direct method of calibrating the system is to used a known location, a recalibration or initial calibration can be accomplished by moving the target to a succession of different positions, all of which can be unknown.

Let the positions be labelled as 1, 2, . . . so that the actual distances are $(a_1, b_1, c_1, d_1), (a_2, b_2, c_2, d_2), \ldots$ The measured positions will then be $(A_1, B_1, C_1, D_1), (A_2, B_2, C_2, D_2), \ldots$ where there are unknown but constant ambiguities in each measurement. Thus, $$A_1=a_1+\delta, B_1=b_1+\beta, C_1=c_1+\gamma, D_1=d_1+\delta$$

$$A_2=a_2+\alpha, B_2=b_2+\beta, C_2=c_2+\gamma, D_2=d_2+\delta$$

Substituting $a_1, b_1, \ldots$ in equation 1 gives:

$$(L-M+N)(A_1^2-2A_1\alpha+\alpha^2)-L(B_1^2-2B_1\beta+\beta^2)+M(C_1^2-2C_1\gamma+\gamma^2)-N(D_1^2-2D_1\delta+\delta^2)=J$$

For the second position, $$(L-M+N)A_2^2-2A_2\alpha+\alpha^2)-L(B_2^2-2\beta+\beta^2)+M(C_2^2-2\gamma+\gamma^2)-N(D_2^2-2D_2\delta+\delta^2)=J$$

so that, using both equations, $$(L-M+N)(A_1-A_2)\alpha-L(B_1-B_2)\beta+M(C_1-C_2)\gamma-N(D_1-D_2)\delta=\tfrac{1}{2}((L-M+N)(A_1^2-A_2^2)-L(B_1^2-B_2^2)=M(C_1^2-C_2^2)-N(D_1^2-D_2^2)$$

A third measurement ($A_3, B_3, C_3, D_3$ say) will give another equation of the form $$(L-M+N)(A_2-A_3)\alpha-L(B_2-B_3)\beta=M(C_2-C_3)\gamma-N(D_2-D_3)\delta=\tfrac{1}{2}((L-M+N)(A_2^2-A_3^2)-L(B_2^2-B_3^2)+m(C_2^2-C_3^2)-N(D_2^2-D_3^2))$$

Thus, with 5 measurements, preferably well-spaced around the available track, four equations can be solved to yield $\alpha, \beta, \gamma$ and $\delta$. These are the previously unknown ambiguous distances that convert the measured distances A, B, . . . into actual distance a, b, . . . . The procedure just outlined provides a mechanism to restore the delays if all signals should be lost. If not more than two signals are lost for a time, then the remaining two stations will continue to track the target and this information enables the ambiguities to be resolved when the signals are recovered. The calculation of the position (x, y) requires only (a, b) since $$x = \frac{a^2 - b^2}{2X} + \frac{X}{Z}, y = \sqrt{a^2 - x^2}$$

where
  a is the distance from (o,o)
  b is the distance from (Xo)

There are other solutions using c and/or d. There is a possibility of obtaining the least error by an appropriate weighting formula but this needs some further work at the moment.

It should be noted that more than 4 stations can be used, particularly if it is necessary to fill in gaps in coverage because of obstructions. In this case the information from any group of 4 can be used to include another station to compensate for the loss of a station and the ambiguity problem for the new station is resolved very quickly, i.e. the full analysis needed to obtain all the unknown constants together is not required.

The use of the invention is as follows.

In use the invention can be used to track a target for example a vehicle such as a racing motor vehicle. The system and apparatus can therefore be used during testing of a vehicle so that a quantitative analysis can be obtained of the effect of varying different components such as tires, aerofoil dimensions, weight distribution, and the like.

Thus, it can be seen that at least in the preferred form of the invention a vehicle tracking system is provided which has the advantage that a highly accurate quantitative vehicle tracking system is provided which will allow detailed comparison to be made of quantities such as velocity and acceleration of a vehicle where changes have been made to the construction or setting up of the vehicle. This is clearly advantageous.

What we claim is:

1. A target tracking system comprising:
an oscillator on a target;
a radio transmitter operatively connected to said oscillator whereby a radio signal representative of a signal generated by said oscillator is transmitted by said transmitter at a selected frequency;
means for translating whereby the transmitted radio signal is received and retransmitted to a base receiving station;
said base receiving station also receiving said transmitted radio signal directly from said transmitter;
said base receiving station including a reference oscillator;
processing means at said base receiving station to enable synchronicity to be maintained between said reference oscillator and the oscillator on said target;
and comparing means connected to said processing means to compare phase changes in the signal received directly from said transmitter and signals retransmitted by said means for translating with a signal generated by said reference oscillator, thereby tracking position parameters of the target relative to the means for translating and the base receiving station.

2. A method of tracking a target comprising:
generating an oscillating signal at said target;
transmitting a radio signal representative of said oscillating signal, at a selected frequency from said target;
receiving said transmitted signal at spaced apart translators;
retransmitting the receiving signal to a base receiving station from each of said spaced apart translators;
receiving said transmitted signal directly from the target at said base receiving station;
processing the signals received by the base receiving station so as to maintain synchronicity between a reference oscillator at said base receiving station and the oscillator on said target; and
comparing phase changes in the signal received directly from said target and signals retransmitted by said translators with a signal generated by said reference oscillator, thereby tracking position parameters of said target relative to said translators and said base receiving station.

3. A target tracking system comprising:

a target at which a target oscillator and a target radio transmitter are positioned, said target radio transmitter being connected to said oscillator for transmitting a radio signal at a selected frequency representative of a signal generated by said oscillator;
translating means positioned remote from said target and receiving said radio signal transmitted by said target radio transmitter and including means for retransmitting said radio signal as a retransmitted radio signal; and
a base receiving station positioned remote from said target and said translating means and receiving said radio signal transmitted by said target radio transmitter and said retransmitted radio signal and at which a reference oscillator for generating a reference signal, processing means, and comparing means are provided, said processing means enabling synchronicity between a signal generated by said reference oscillator with said signal received from said target radio transmitter, said comparing means being connected to said processing means for comparing phase changes in the radio signal transmitted by and received directly from said target radio transmitter and said retransmitted radio signal from said translating means with said reference signal generated by said reference oscillator for tracking position parameters of the target relative to said translating means and said base receiving station.

4. The target tracking system of claim 3, wherein said translating means comprises a plurality of translators each of which is positioned remote from said target and said base receiving station, each of said translators receiving said radio signal transmitted by said target transmitter and retransmitting a corresponding retransmitted radio signal for reception by said base receiving station, said comparing means of said base receiving station comparing phase changes in said radio signal received from said target radio transmitter and each of said corresponding retransmitted radio signals with said reference signal generated by said reference oscillator.

5. The target tracking system of claim 3, wherein said target is a moving target within a defined area and said position parameters of said target include position, velocity and acceleration of the target within said defined area.

6. A method for tracking a target comprising the steps of:
providing a target movable within a defined area;
generating an oscillating signal at said target;
transmitting a radio signal representative of said oscillating signal at a selected frequency from said target;
providing a plurality of translators remote from said target for receiving said radio signal and retransmitting a corresponding retransmitted radio signal;
providing a base station remote from said target;
receiving at said base station said radio signal transmitted from said target and said corresponding retransmitted radio signals from said translators;
generating a reference oscillator signal at said base station;
processing the radio signal received from said target so as to maintain synchronicity between the oscillator signal generated at said target and said reference oscillating signal at said base station; and
comparing phase changes in the radio signal received directly from said target and said corresponding retransmitted radio signals with said reference oscillator signal for tracking position parameters of said target relative to said translator and said base receiving station.

7. The method of claim 6, wherein said position parameters include position, velocity and acceleration of said target in said defined area.

* * * * *